(12) United States Patent
Kim (10) Patent No.: US 7,155,797 B2
(45) Date of Patent: Jan. 2, 2007

(54) CONTINUOUS MANUFACTURING SYSTEM FOR COMPOSITE ALUMINUM PANELS

(76) Inventor: Byung Shik Kim, #129-904 Parktown, 55 Sunaedong Bundanggu Sungnam city Kyunggido, Kyunggido (KR) 463-020

( * ) Notice: Subject to any disclaimer, the term of this patent is extended or adjusted under 35 U.S.C. 154(b) by 78 days.

(21) Appl. No.: 10/516,990

(22) PCT Filed: Aug. 12, 2003

(86) PCT No.: PCT/KR03/01618

§ 371 (c)(1),
(2), (4) Date: Dec. 6, 2004

(87) PCT Pub. No.: WO2004/098884

PCT Pub. Date: Nov. 18, 2004

(65) Prior Publication Data

US 2005/0204561 A1  Sep. 22, 2005

(30) Foreign Application Priority Data

| May 7, 2003 | (KR) | ...................... 10-2003-0029037 |
| May 7, 2003 | (KR) | ...................... 10-2003-0029038 |

(51) Int. Cl.
*B21D 35/00* (2006.01)

(52) U.S. Cl. ..................... 29/469.5; 29/6.1; 29/897.32; 29/771; 29/788

(58) Field of Classification Search ............. 29/6.1, 29/6.2, 17.3, 33 K, 771, 787, 788, 904, 897.32, 29/469.5; 428/116
See application file for complete search history.

(56) References Cited

U.S. PATENT DOCUMENTS

| 2,074,352 A | * | 3/1937 | Armstrong ................ 228/118 |
| 2,354,765 A | * | 8/1944 | Meyer et al. ................ 29/779 |
| 2,371,458 A | * | 3/1945 | Meyer et al. ................ 29/779 |
| 2,636,540 A | * | 4/1953 | Lincoln ...................... 156/474 |
| 3,755,038 A | * | 8/1973 | Atteck ........................ 156/197 |
| 3,912,573 A | * | 10/1975 | Kunz .......................... 156/471 |
| 4,450,027 A | * | 5/1984 | Colson ........................ 156/193 |
| 5,295,296 A | * | 3/1994 | Hagiwara et al. ............. 29/827 |
| 5,460,865 A | | 10/1995 | Tsotsis |
| 5,545,284 A | * | 8/1996 | Miura ......................... 156/474 |
| 6,099,683 A | * | 8/2000 | Meier et al. ................. 156/292 |
| 6,192,571 B1 | * | 2/2001 | Morrison ...................... 29/428 |
| 6,823,571 B1 | * | 11/2004 | Ragland et al. .............. 29/17.4 |
| 2001/0001409 A1 | * | 5/2001 | Weight et al. .............. 156/197 |
| 2002/0092620 A1 | * | 7/2002 | Goodhue .................... 156/512 |

FOREIGN PATENT DOCUMENTS

EP  087546  9/1983

(Continued)

*Primary Examiner*—Essama Omgba
(74) *Attorney, Agent, or Firm*—The Farrell Law Firm (57) ABSTRACT

A continuous manufacturing system for composite aluminum panels comprises a continuous expanding device for expanding a raw material of a core and a main body of a continuous manufacturing system of composite aluminum panels. The continuous expanding device consists of a cramp for holding raw material, a raw material supplier, a number of sliding rods for sliding raw material and the core, a subsidiary cramp that reciprocates from side to side and ascends and descends on racks, a cramp for expanding a raw material and a roller running idle transferring to the main body. The main body consists of a supplying part for providing top and bottom aluminum plates, a supplying part for providing adhering materials, a combination part comprising the upper and lower rollers and a hot pressing part comprising rollers for hot pressing and supporting are provided.

8 Claims, 5 Drawing Sheets

FOREIGN PATENT DOCUMENTS

| | | |
|---|---|---|
| EP | 0624459 | 11/1994 |
| GB | 2227449 | 8/1990 |
| KR | 1020030005885 | 1/2003 |

\* cited by examiner

CONTINUOUS MANUFACTURING SYSTEM FOR COMPOSITE ALUMINUM PANELS

BACKGROUND OF THE INVENTION

1. Field of the Invention

The present invention relates to a system manufacturing composite aluminum panels continuously by using metal (aluminum) cores being expanded continuously in manufacture of composite aluminum panels.

2. Description of the Related Art

Up to now, for manufacture composite aluminum panels inserted honeycomb cores, honeycomb type metal (hereinafter refer to as aluminum) cores are expanded in a certain length by a manual expanding device, hot-melt film layers are put on the upper and the lower sides of the expanded cores and on the film layers aluminum plates are put, the objects are pressed in hot presses, to give composite aluminum panels.

But in this case expanding devices of aluminum cores should be operated manually and thus the cores can not expanded continuously.

Accordingly the standardized panels can not be manufactured continuously.

Now, referring to the accompanying drawings, a method for expanding cores for composite aluminum panel by the conventional device for expanding cores and a conventional process for preparing panels by using the expanded cores will be described as follows.

Figure 5:
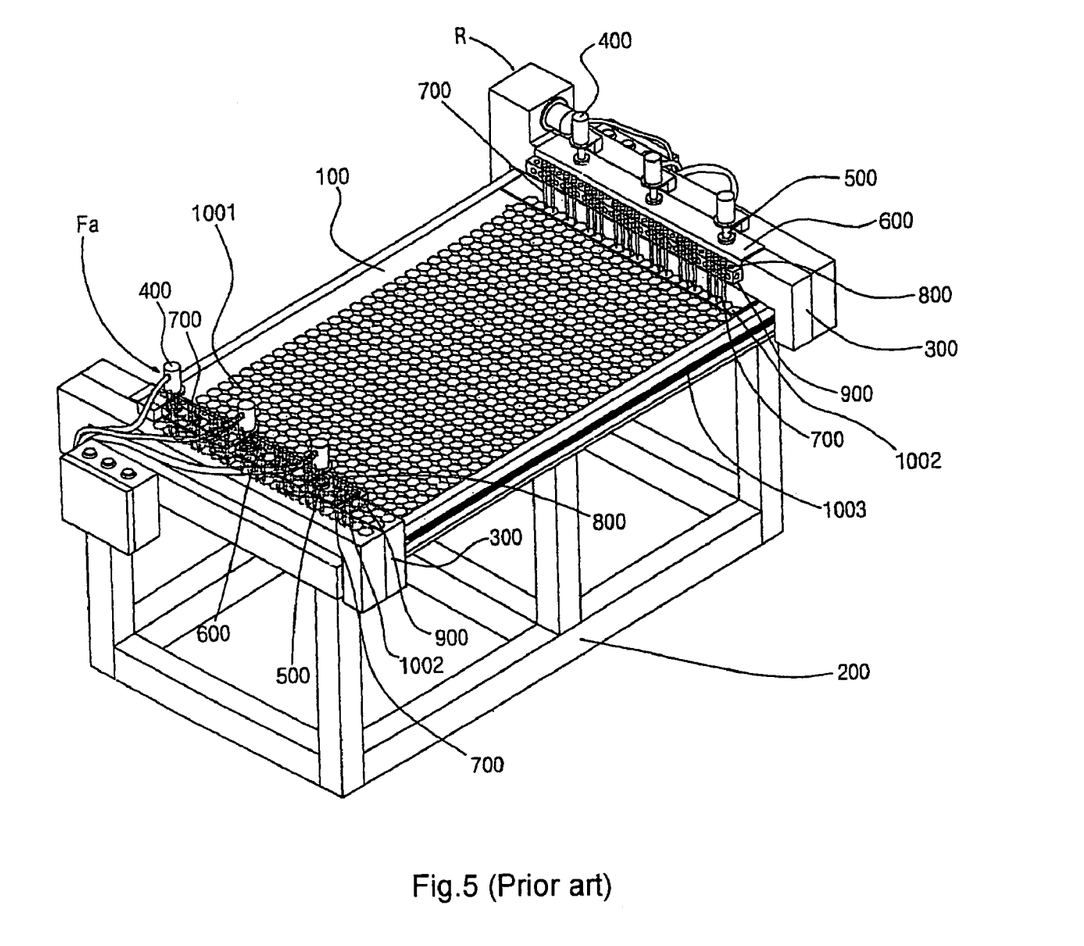
FIG. 5 represents an illustration view of a conventional expanding device for a honeycomb type core.

As shown in FIG. 5, a fixing part Fa fixing a left end of pre-expanded raw material 1001 for honeycomb type cores comprising a supporter 300 fixed on the upper one side of a base 200, a number of air pressure cylinders 400 ascending and descending on the supporter 300, a stair type bracket 600 fixed on the lower ends of rods 500 of the cylinders 400, a holding rod 900 for taking needle rods 700 mounted on the bracket 600 and having a number of holes 800 capable of inserting and drawing needle rods 700 for fixing on a number of holes 1002 of honeycomb type cores; a transferring part R comprising the supporter 300, a number of the air pressure cylinder 400, the stair type bracket 600 and a holding rod 900 for taking needle rods having a number of inserting and drawing holes 800 identical to those of the fixing part Fa, and a pinion gear (not shown) established on the lower end of the supporter 300, engaging with a rack 1003 established on the upper both sides of the base 200 to transfer right and left; and plate 100 for expanding the honeycomb type core formed between the fixing part Fa and transferring part R.

But to manufacture the expanded honeycomb type cores from raw material for core by the conventional device for expanding honeycomb type core, after a number of needle rods 700 are inserted perpendicularly in the inserting and drawing holes 800 for the needle rods of the fixing part Fa manually, by means of ascent and descent of ascending and descending cylinder the bracket 600 fixed on the lower part of the cylinder is gone up and come down to ascend and descend the holding rod 900 for taking needle rods 700 fixed on the bracket 600, and by means of ascent and descent of the holding rod 900 the lower ends of the needle rods 700 inserted in the inserting and drawing holes 800 of the holding rod 900 are fixed, by means of inserting, in the holes 1002 of the honeycomb type core expanded partially in left end of raw material for the honeycomb type core.

At this time, by means of the pinion gear (not shown) fixed on the lower end of the transferring part R engaged with the rack established on the upper both sides of the base 200, the transferring part R is transferring manually to lie adjacent to the fixing part Fa, then the lower ends of the needle rods 700 inserted in the inserting and drawing holes 800 for needle rods of the holding rod 900 fixed on the transferring part R are inserted in the holes 1002 of the honeycomb type core expanded partially or manually of the right end of the raw material (core-raw material) 1001 for the honeycomb type core and the transferring part R is transferred manually in the right direction to give expanded honeycomb type core from the raw material 1001 for the honeycomb type core.

However, in the conventional device, the needle rods 700 for taking the core-raw material 1001 should be inserted manually in the inserting and drawing holes 800 for needle rods, the transferring part R also should be transferred manually in right and left, length and width of the honeycomb type core manufactured by the device also are restricted, that is, in one device cores having restricted length and width only are manufactured.

Accordingly this device has faults that various sorts of cores having different length and width cannot be made.

Furthermore, in manufacturing composite aluminum panels by using honeycomb type cores expanded by this device because all of honeycomb type cores, hot melting films and aluminum plates as raw materials for manufacturing the panel should be layered only manually, the raw materials cannot be layered in the same mode.

Accordingly by means of the above-mentioned conventional device standardized articles cannot be produced and also long and large panels cannot be produced continuously.

SUMMARY OF THE INVENTION

The present invention relates to continuous manufacturing system for composite aluminum panels characterized in that honeycomb type core as medium material for manufacturing a composite aluminum panel can be expanded continuously and automatically to give expanded honeycomb cores, the expanded honeycomb type core can be provided together with hot melting films and aluminum plates continuously and automatically to give the composite aluminum panel, thickness of the panel can be adjusted automatically by a roller for controlling the thickness and a hot pressing roller, width of the panel can be adjusted automatically by a device supporting left and right sides, the resulting composite aluminum panel is passed through, in sequence, rapid and slow cooling devices, a pinch roller, a roller adhering protecting tapes and side cutters to give, continuously and in great quantities, various length of composite aluminum panels having uniform thickness and width inserted honeycomb type cores.

Now, the continuous manufacturing system of the present invention will be described in detail referring to the accompanying drawings in below.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF AN EXEMPLARY EMBODIMENT

Figure 1:
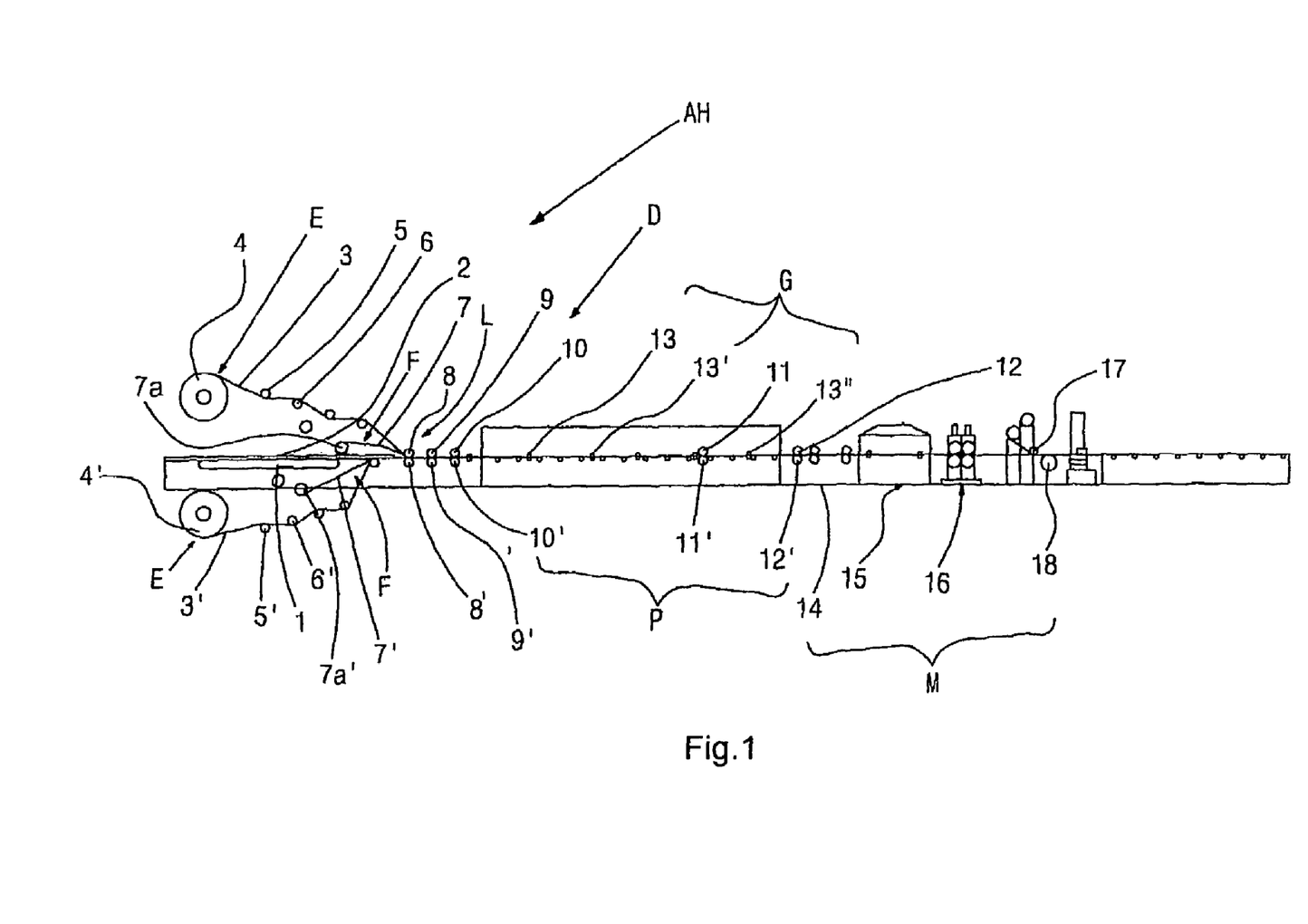
FIG. 1 represents a general schematic elevation view of a system in accordance with the present invention.

A continuous manufacturing system for composite aluminum panels of the present invention is comprised of a continuous expanding device CE for expanding a honeycomb type core for a composite aluminum panel and a main body AH of a continuous manufacturing system of composite aluminum panels having honeycomb type cores.

Figure 2:
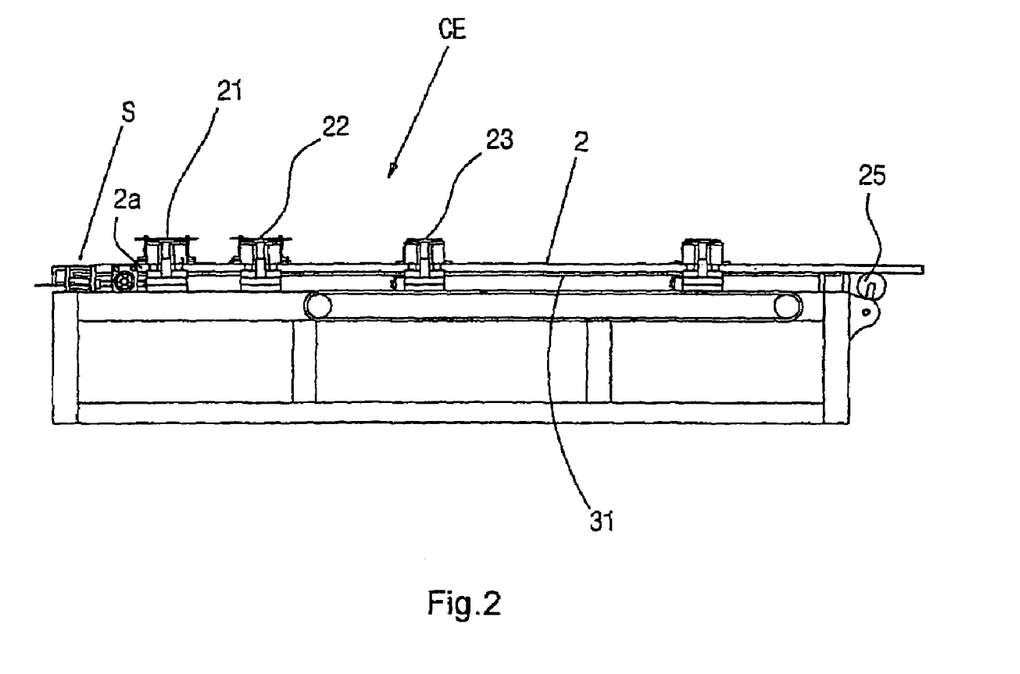
FIG. 2 represents a schematic elevation view of continuous expanding device in accordance with the present invention.
Figure 3:
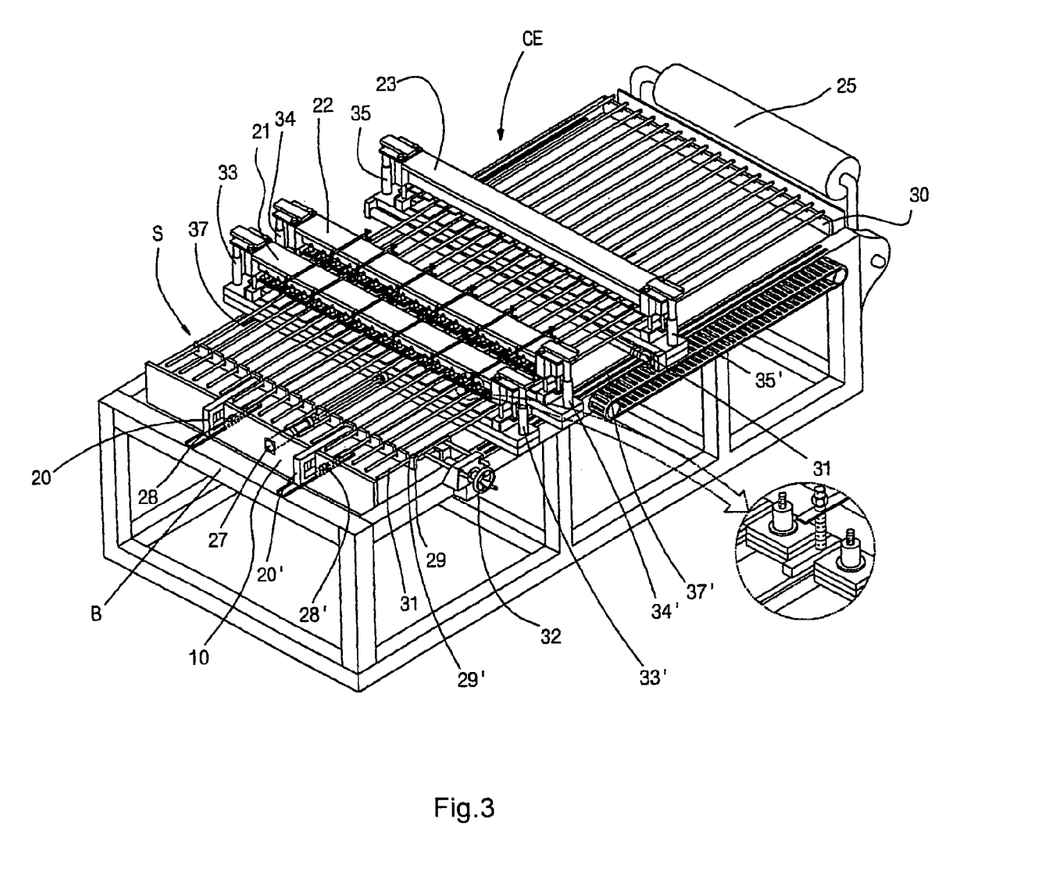
FIG. 3 represents a general perspective view of a continuous expanding device in accordance with present invention.

In the continuous manufacturing system of composite aluminum panels having honeycomb type cores the continuous expanding device CE for the core consists of a cramp 21 for holding raw material 2a before expansion (pre-expanding) for manufacturing a honeycomb type core which ascends and descends by means of perpendicular cylinders 33, reciprocates from side to side on racks 37, 37' established on the upper part of a main body B by means of a cylinder 27 that the outer end is mounted on perpendicular plate 10 of the main body B; a raw material supplier S that a pusher 29 for pushing raw material having a number of U type grooves 29' in a certain space is fixed on the right upper end of ⊏type brackets 20, 20' which mounted on the perpendicular plate 10 fixed on the upper end of the main body B and reciprocated from side to side by means of cylinders 28, 28' connected with lower ends of the brackets; a number of sliding rods 31 for sliding raw material 2a for the core and the core 2 that their positions are controlled in front and in the rear by means of a centering handle 32 connected with the front side of the most outer rod of their rods 31 and their right and left ends are mounted on the grooves 29' of the pusher 29 and on length-wise supporter 30 equipped under a transferring roller 25 which mounted on the right end of the expanding device CE, respectively; a subsidiary cramp 22 that reciprocates from side to side on racks 37, means of a cylinder (not shown) and simultaneously is ascended and is descended by means of perpendicular cylinders 34, hold fixedly the right side of the core near the cramp 21 for holding raw material when the cramp 21 for holding is transferred to the left as much as intended width for expanding raw material 2a to hold the left side of the raw material; a cramp 23 for expanding a raw material for a core that reciprocates from side to side by means of a cylinder (not shown) and ascends and descends by means of perpendicular cylinders 35, 35', wherein the pre-expanded right end of the raw material 2a for the core that the left end thereof is held by the cramp 21 for holding, is held by means of the expanding cramp 23 to expand it to the right side of side main body B of the expanding device CE; a transferring roller 25 running idle for transferring an expanded core that situates at the right end of the main body B and transfers the expanded honeycomb type core 2 to a middle conveyer 1 of a combination part L in a main body AH of a continuous manufacturing system for composite aluminum panels.

In the continuous manufacturing system for the composite aluminum panels having honeycomb type cores the main body AH consists of supplying part providing top and bottom aluminum plates 3, 3' passing through rollers 5, 5', 6, 6' from the upper and lower roles 4, the upper and lower sides of the expanded honeycomb type core 2 being supplied from the continuous expanding device CE for the core; supplying part F for providing adhering materials by means of any one device selected from a device for providing hot-melt films 7, an adhering material, being melted by hot press of a hot pressing part P as a post-process, from roles 7a, providing films between the expanded honeycomb type core 2 and the upper and lower aluminum plates 3, 3', an applicator (not shown) spraying hot melting thermoplastic resin adhesive made from any one of thermoplastic resins such as polyethylene, polyisobutylene, polyamide, ethylene vinyl acetate copolymer, polyurethane, or a device (not shown) for spraying liquid thermosetting resin adhesive made from any one of thermosetting resins such as epoxy or phenol resin; a combination part L comprising the upper and lower rollers 8, combining aluminum plates 3, 3', adhering materials and the expanded core 2, providing from the supplying parts and device; a hot pressing part P comprising upper and lower rollers 10, 10', 11, 11', 12, hot pressing and supporting; a finishing part M comprising a quick cooling apparatus 14, a slow cooling apparatus 15, an adhering roller 17 for protecting tape, a side cutter 18 for cutting sides of molded panel and a roller 16 for pinching the completed panel, established in sequence behind the hot pressing part P to finish the completed composite aluminum panel having the honeycomb type core.

Furthermore, between, before or behind the combination part L and the hot pressing part P, thickness controlling part D consisting of rollers 9, controlling thickness and a side supporting part G consisting of apparatuses 13, 13', 13" for supporting sides of the completed panel may be established.

Figure 4:
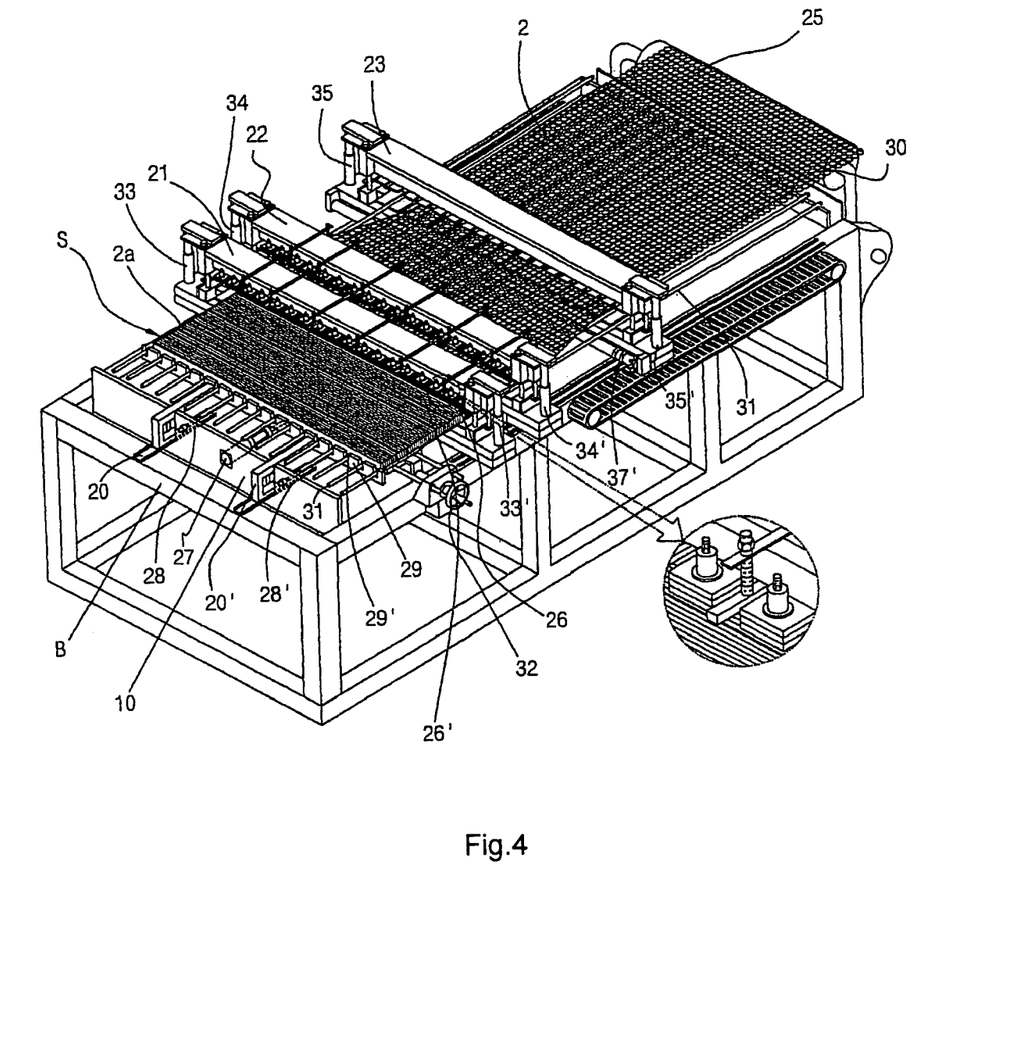
FIG. 4 represents an illustration view showing expanding state utilized a continuous expanding device of the honeycomb type core in accordance with the present invention.

To manufacture the composite aluminum panel having honeycomb type cores, utilizing the continuous manufacturing system for the composite aluminum panels of the above-mentioned present invention, first of all, as shown in FIGS. 2, 3 and honeycomb type core is expanded continuously utilizing the continuous expanding device CE of the honeycomb type core for the composite aluminum panel as follows;

The cramp 21 for holding raw material 2a is transferred to the right pre-set position by means of the operation of the cylinder 27 for operating the cramp 21 and simultaneously the subsidiary cramp 22 also is transferred to lie adjacent the cramp 21, a bundle of raw material 2a for honeycomb type core adhered each other a number of units of the raw material 2a by means of an adhesive or double-faced adhesive tape is put on a number of the sliding rods 31 of the raw material supplier S for the core, first, the cramp 21 for holding raw material and the subsidiary cramp 22 are ascended by means of the perpendicular cylinders 33, 34, 34', then the raw material 2a for the core is pushed to the right side using the pusher 29 which fixed on the right upper end of the brackets 20, operated by means of cylinders 28, the raw material supplier S for the core so that the raw material 2a for the core is projected as much as width pre-set to expand to the right side of the cramp 21 for holding raw material and the subsidiary cramp 22, after the cramp 21 for holding is descended by means of the perpendicular cylinders 33, hold the left side of the raw material 2a for the core, the ascended expanding cramp 23 is transferred to the left side on the rack gears 37, means of the cylinder (not shown) and then the expanding cramp 23 is descended by means of the perpendicular cylinders 35, hold the right side of the raw materials for the core, and the resulting cramp 23 held raw material 2a for the core is transferred to the transferring roller 25 on the main body B of the continuous expanding device CE to give a standardized honeycomb type core.

Furthermore, in order to that the expanded honeycomb type core is manufactured continuously and composite aluminum panels having the honeycomb type core are manufactured with the resulting honeycomb type core continuously, a continuous manufacturing process is repeated as follows.

The expanding cramp 23 completed the expansion of the core in a certain length is ascended by means of the perpendicular cylinders 35, the subsidiary cramp 22 is descended by means of the cylinders 34, hold core expanded to the right side of the cramp 21 for holding, after the cramp 21 for holding is ascended by means of the cylinders 33, transfer to the left side of the raw material 2a as much as width pre-set to expand, in identical method to the above-mentioned process the cramp 21 for holding is descended to hold raw material 2a for the core, the subsidiary cramp 22 is ascended, the ascended expanding cramp 23 is transferred to the left side and then is descended to hold the expanded core adjacent to the subsidiary cramp 22, and the expanding cramp 23 held the right of the expanded core is transferred to the right transferring roller 25 to give continuously the honeycomb type core expanded completely and the resulting expanded honeycomb type core is provided continuously the main body AH of the continuous manufacturing system for the composite aluminum panels.

On the upper and lower sides of the honeycomb type core provided from the continuous expanding device, aluminum plates 3, 3' are provided passing through rollers 5, 6, the upper and lower rolls 4, the supplying part E for providing aluminum plates and simultaneously between the expanded honeycomb type core and aluminum plates, any one of adhering material selected from hot-melt films, hot melting thermoplastic resin adhesive or liquid thermosetting resin adhesive provided from the supplying part F for providing adhering materials is provided (in the mode of the present invention the hot-melt films 7, provided from roles 7a, providing film), the combined body consisting of the honeycomb type core, the adhering material and aluminum plates is passed through the combination rollers 8, the combination part L pinching by means of the roller 16 for pinching the combined body for the composite aluminum panel to maintain it tightly, wherein in case that the thickness controlling part D is established in this system the combined body as a composite aluminum panel is passed through the thickness controlling rollers 9, control in a certain thickness, then the resulting composite aluminum panel is passed through the hot-pressing part P to control the its thickness twice by means of hot-pressing, also in case that the side supporting part G is established in this system the width of the composite aluminum panel is maintained regularly by means of the side supporting apparatuses 13, 13', the side supporting part G, and then the cooling processes by means of the quick and slow cooling apparatuses 14, 15, the adhering process of protecting tape by means of adhering roller 17 for adhering protection tape and the cutting process cutting by means of the cutter 18 the resulting panel in a certain length is carried out, in sequence, to give a certain length of the completed composite aluminum panels.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A continuous manufacturing system for composite aluminum panels comprising;
   a continuous expanding device for expanding raw material of a core comprising:
      a first cramp for holding raw material before expansion for manufacturing a honeycomb type core, which is disposed at a right part of a raw material supplier;
      the raw material supplier comprising:
         a pusher for pushing raw material having a number of U type grooves, wherein the pusher is fixed on a right upper end of ⊏type brackets;
         a plurality of sliding rods installed from the raw material supplier to a vicinity of a transferring roller for sliding raw material for the core;
      a subsidiary cramp for holding fixedly a right side of the core, which is disposed at the right part of the first cramp, the subsidiary cramp reciprocating from side to side on racks, by means of a cylinder and simultaneously ascends and descends by means of perpendicular cylinders;
      a second cramp for expanding the raw material for the core to a right side of a main body, which is disposed at the right part of the subsidiary cramp, the second cramp reciprocating from side to side by means of a cylinder and ascends and descends by means of perpendicular cylinders;
      the transferring roller running idle for transferring an expanded core by cooperating the second cramp, which is situated at the right side of the main body;
   the main body comprising:
      a first supplying part for providing upper and lower sides of the expanded honeycomb type core with top and bottom aluminum plates by passing through rollers from upper and lower rollers;
      a second supplying part for providing adhering materials, which is disposed between the upper and lower rollers,
      a combination part for combining the aluminum plates, the adhering materials and the expanded honeycomb type core, which includes the upper and lower rollers;
   a hot pressing part for pressing composite aluminum panels supplied from the combination part, the hot pressing part comprising:
      upper and lower hot pressings;
      supporting rollers; and
   a finishing part comprising:
      a quick cooling apparatus;
      a slow cooling apparatus;
      an adhering roller for a protecting tape;
      a side cutter for cutting sides of a completed panel; and
      a roller for pinching the completed panel established in sequence behind the hot pressing part.

2. A continuous manufacturing system for composite aluminum panels in accordance with claim 1 in which said first cramp comprises perpendicular cylinders for ascending and descending the first cramp, a cylinder for reciprocating from side to side on racks established on an upper part of the main body and an outer end mounted on a perpendicular plate of said main body.

3. A continuous manufacturing system for composite aluminum panels in accordance with claim 1 in which said raw material supplier is mounted on a perpendicular plate fixed on an upper end of the main body and reciprocated from side to side by means of cylinders connected with lower ends of the brackets.

4. A continuous manufacturing system for composite aluminum panels in accordance with claim 1 in which a front side of a most outer rod of said plurality of sliding rods for sliding raw material for the core is connected with a centering handle controlling a position in a front and in the rear, and their right and left ends are respectively mounted on the grooves of said pusher and on a length-wise supporter provided under the transferring roller which is mounted on the right end of the expanding device.

5. A continuous manufacturing system for composite aluminum panels in accordance with claim 1 in which said supplying part for providing adhering materials comprises any one device selected from a device for providing hot-melt films, rollers, providing film, an applicator spraying hot melting thermoplastic resin adhesive and a device for spraying liquid thermosetting resin adhesive.

6. A continuous manufacturing system for composite aluminum panels in accordance with claim 5 in which said hot melting thermoplastic resin adhesive is made from thermoplastic resins selected from polyethylene, polyisobutylene, polyamide, ethylene vinyl acetate copolymer and polyurethane.

7. A continuous manufacturing system for composite aluminum panels in accordance with claim 5 in which said liquid thermosetting resin adhesive is made from thermosetting resins selected from epoxy or phenol resin.

8. A continuous manufacturing system for composite aluminum panels in accordance with claim 1 in which between, before or behind the combination part and the hot pressing part, a thickness controlling part consisting of rollers for controlling thickness, and a side supporting part for supporting sides of a completed panel are provided.

* * * * *